United States Patent [19]

Akamatsu et al.

[11] Patent Number: 5,840,220

[45] Date of Patent: Nov. 24, 1998

[54] ORGANOSILOXANE COMPOSITION AND METHOD FOR PREPARING SAME

[75] Inventors: Shoji Akamatsu; Yasue Kanzaki, both of Chiba Prefecture, Japan

[73] Assignee: Dow Corning Toray Silicone Co., Ltd., Tokyo, Japan

[21] Appl. No.: 845,248

[22] Filed: Apr. 21, 1997

Related U.S. Application Data

[62] Division of Ser. No. 633,633, Apr. 17, 1996, Pat. No. 5,661,203.

[51] Int. Cl.$^6$ ................................................. B29C 35/04
[52] U.S. Cl. ........................... 264/15; 523/218; 525/100; 525/431; 525/464
[58] Field of Search .............................. 264/15; 523/218; 525/100, 431, 464

[56] References Cited

U.S. PATENT DOCUMENTS

| | | | |
|---|---|---|---|
| 4,108,934 | 8/1978 | Rubens et al. | 564/5 |
| 4,283,311 | 8/1981 | Blount | 260/9 |
| 4,416,790 | 11/1983 | Schürmann et al. | 252/62 |
| 4,678,828 | 7/1987 | Nakamura et al. | 524/269 |
| 5,268,433 | 12/1993 | Ikeno et al. | 525/478 |

FOREIGN PATENT DOCUMENTS

| | | |
|---|---|---|
| 308241 | 12/1988 | Japan . |
| 308242 | 12/1988 | Japan . |

*Primary Examiner*—Margaret W. Glass
*Attorney, Agent, or Firm*—Paula J. Lagattuta; Sharon K. Severance

[57] ABSTRACT

Organosiloxane compositions exhibiting excellent vibration damping properties comprise (A) from 70 to 99.9 weight percent of a liquid polyorganosiloxane, (B) from 0.1 to 10 weight percent of hollow particles of a thermoplastic organic resin, and (C) from 0 to 20 weight percent of a thickener.

3 Claims, No Drawings

ORGANOSILOXANE COMPOSITION AND METHOD FOR PREPARING SAME

This is a division of Ser. No. 08/633,633, filed Apr. 17, 1996, and now U.S. Pat. No. 5,661,203.

BACKGROUND OF THE INVENTION

1. Field of the Invention

This invention relates to filled organosiloxane compositions and to a method for preparing the composition. More particularly, the present invention relates to organosiloxane compositions exhibiting excellent vibration-damping properties and to a method for preparing these composition.

2. Background Information

Polyorganosiloxane oils, organosiloxane compounds, and organosiloxane gels are used as vibration-proofing elements in optical read-out devices such as compact disks and laser disks, and in magnetic read-out devices such as magnetic disks and "floppy" optical disks, referred to as "floptical" disks; and in precision equipment such as precision measurement devices. The organosiloxane compositions used in these applications range in consistency from oils to semi-solids and are composed of polyorganosiloxane oils plus one or more fillers.

Liquid organosilicon compounds are particularly suitable as vibration-damping materials because they lack rubbery elasticity and because they can dampen external vibrations through internal friction within the organosiloxane compound itself and between the oil and a filler.

Vibration damping organosiloxane compositions are exemplified by bends of finely divided inorganic particles with polyorganosiloxane oils, also referred to as "silicone oils", and are described in Japanese Patent Application Laid Open [Kokai or Unexamined] Numbers Sho 57-168997 [168,997/1982] and Sho 63-308241 [308,241/1988] and blends of a finely divided powdered organic resin with silicone oil as described in Japanese Patent Application Laid Open Number Sho 63-308242 [308,242/1988]. A disadvantage of these organosiloxane compositions is their inadequate vibration-damping properties.

One objective of the present invention is to provide organosiloxane compositions that have excellent vibration-damping properties. An additional objective of this invention is to provide a method for preparing these compositions.

SUMMARY OF THE INVENTION

The present inventor discovered that the disadvantages of prior art resin-filled vibration-damping compositions can be overcome by using as the filler finely divided hollow particles of a silicone resin containing a blowing agent. The particles are obtained by heating resin particles containing a blowing agent in the presence of a polyorganosiloxane oil and a thickening agent to activate the blowing agent, thereby irreversibly expanding the resin particles.

DETAILED DESCRIPTION OF THE INVENTION

The present invention provides organosiloxane compositions comprising (A) from 70 to 99.9 weight percent of a polyorganosiloxane oil, (B) from 0.1 to 10 weight percent of finely divided hollow particles of a thermoplastic organic resin, and (C) from 0 to 20 weight percent of a thickener.

The present invention also provides a method for preparing the present compositions, wherein said method comprises heating a composition comprising (A) from 70 to 99.9 weight percent of a polyorganosiloxane oil, (B') from 0.1 to 10 weight percent of finely divided particles of a thermoplastic organic resin containing a blowing agent, wherein said particles become hollow by an irreversible expansion during said heating due to the action of gaseous products generated by said blowing agent, and (C) from 0 to 20 weight percent of a thickener The ingredients of the present organosiloxane compositions will now be described in detail.

The Polyorganosiloxane Oil (Ingredient A)

The polyorganosiloxane oil, referred to as ingredient A, is the base material of the organosiloxane composition of the present invention. The molecular structure of ingredient A is not specifically restricted, and includes but is not limited to straight chain, partially branched straight chain, cyclic, and network structures. Straight-chain structures are particularly preferred.

The terminal groups present in the polyorganosiloxane oil are not specifically restricted when the molecular structure of this ingredient is straight chain or partially branched straight chain molecule. Suitable terminal groups include but are not limited to triorganosiloxy groups such as trimethylsiloxy, dimethylvinylsiloxy and dimethylphenylsiloxy; hydroxydiorganosiloxy groups such as hydroxydimethylsiloxy, hydroxymethylvinylsiloxy and hydroxymethylphenylsiloxy; and diorganohydrogensiloxy groups such as dimethylhydrogensiloxy and methylphenylhydrogensiloxy. Trimethylsiloxy and hydroxydimethylsiloxy are particularly preferred terminal groups.

No specific restrictions apply to the silicon-bonded organic groups present in ingredient (A). These groups include but are not limited to alkyl radicals such as methyl, ethyl, propyl, butyl, pentyl and hexyl; alkenyl radicals such as vinyl, allyl, butenyl, pentenyl and hexenyl; aryl radicals such as phenyl, tolyl and xylyl; aralkyl radicals such as benzyl, and phenethyl; and substituted radicals such as 3-chloropropyl, and 3,3,3-trifluoropropyl.

Polyorganosiloxane oils suitable for use as ingredient A include but not limited to:
trimethylsiloxy-endblocked dimethylpolysiloxanes,
hydroxydimethylsiloxy-endblocked dimethylpolysiloxanes,
dimethylvinylsiloxy-endblocked dimethylpolysiloxanes,
dimethylphenylsiloxy-endblocked dimethylpolysiloxanes,
trimethylsiloxy-endblocked methylphenylpolysiloxanes,
hydroxydimethylsiloxy-endblocked methylphenylpolysiloxanes,
dimethylvinylsiloxy-endblocked methylphenylpolysiloxanes,
trimethylsiloxy-endblocked methylvinylpolysiloxanes,
hydroxydimethylsiloxy-endblocked methylvinylpolysiloxanes,
trimethylsiloxy-endblocked dimethylsiloxane/methylphenylsiloxane copolymers,
trimethylsiloxy-endblocked dimethylsiloxane-methylvinylsiloxane copolymers,
trimethylsiloxy-endblocked methylphenylsiloxanemethylvinylsiloxane copolymers,
trimethylsiloxy-endblocked methyl(3,3,3-trifluoropropyl) polysiloxanes,
cyclic dimethylpolysiloxanes,
cyclic methylvinylpolysiloxanes,
cyclic dimethylsiloxane-methylvinylsiloxane copolymers, and cyclic dimethylsiloxane-methylphenylsiloxane copolymers.

Although the viscosity of ingredient A is not specifically restricted, there is a strong tendency for ingredient B to separate and aggregate when ingredient A has a viscosity at 25° C. of below 100 centistokes ($1\times10^{-4}$ m$^2$/sec). When, on the other hand, ingredient A has a viscosity in excess of 1,000,000 centistokes (1 m$^2$/sec), the resulting polyorganosiloxane oil is extremely difficult to handle. As a result, the preferred range for the viscosity of ingredient (A) at 25° C. is from $\times10-4$ to m$^2$/sec.

Ingredient A can be a single polyorganosiloxane oil or it may consist of a mixture of two or more polyorganosiloxane oils. Suitable mixtures include oils having different viscosities, and mixtures of oils containing different silicon-bonded organic groups.

Ingredient A constitutes from 70 to 99.9 weight percent of the present compositions. The final composition of this invention is difficult to handle when the concentration of ingredient A is less than 70 weight %, while the vibration-damping properties of the resulting silicone compound are sharply reduced when the concentration of ingredient A exceeds 99.9 weight %.

The Hollow Resin Particles (Ingredient B)

Ingredient B, which consists of hollow finely divided particles of a thermoplastic organic resin, is the ingredient that characterizes the present organosiloxane compositions. Ingredient B has a hollow structure, and no specific restrictions apply to the type of thermoplastic organic resin that forms the walls or partitions of this hollow structure. Suitable thermoplastic organic resins include but are not limited to:

homopolymers of vinylic monomers such as ethylene, propylene, styrene, vinyl acetate, vinyl chloride, vinylidene chloride, methyl methacrylate, acrylonitrile, butadiene, and chloroprene;

copolymers of these vinylic monomers, such as vinylidene chloride-acrylonitrile copolymers, vinyl chloride-acrylonitrile copolymers, vinyl acetate-butadiene copolymers, ethylene-propylene copolymers, styrene-butadiene copolymers, and ethylene-propylene-butadiene copolymers;

polyamides such as nylon-6 and nylon-6,6; and and polyesters such as polyethylene terephthalate.

The ingredients that occupy the hollow interior of the particles that constitute ingredient B are also not specifically restricted and may include the blowing agent used to create the hollow particles, residues of the blowing agent, and gases, such as air, nitrogen, helium, argon and neon that have replaced the blowing agent due to volatilization and dissipation of the blowing agent.

The morphology of the particles that constitute ingredient B is not specifically restricted and may, for example, be spherical, disk-shaped, or gourd-shaped. A spherical shape is preferred. While the particle size of this ingredient is not specifically restricted, particle sizes in the range of 5 to 500 micrometers are preferred because they yield organosiloxane compositions with particularly good vibration-damping properties.

Ingredient B constitutes from 0.1 to 10 weight percent of the present compositions. The vibration damping properties of the final organosiloxane composition are reduced when the concentration of this ingredient is less than 0.1 weight percent. At the other extreme, when the concentration of ingredient B is less than 10 weight percent, it becomes difficult to blend this ingredient into ingredient A, and in particular, the resulting composition becomes very difficult to handle.

The Thickening Agent (Ingredient C)

The thickener comprising ingredient C is an optional ingredient that inhibits separation of ingredients A and B, thereby improving the storage stability of the present compositions. Ingredient C is exemplified by but not limited to finely divided silica with a specific surface are of at least 50 m$^2$/g, fumed titanium oxide, colloidal calcium carbonate, alumina, iron oxide, carbon black, and liquid polyethers.

Finely divided silica with a specific surface of at least 50 m$^2$/g is preferred, and silica with a specific surface in the range of from 100 m$^2$/g to 500 m$^2$/g is particularly preferred. The morphology of ingredient C is not specifically restricted, and it may be, for example, spherical, disk-shaped, or fibrous with spherical being preferred. The type of preferred finely divided silica encompassed by ingredient C is not specifically restricted and is exemplified by dry-process silica, calcined silica, wet-process silica, and silica aerogel.

The surface of the silica particles is preferably pre-treated with an organohalosilane, organoalkoxysilane, organosilazane, or an polyorganosiloxane such as organohydrogenpolysiloxane, hydroxydiorganosiloxy-endblocked dimethylsiloxane oligomer, hydroxydiorganosiloxy-endblocked methylvinylsiloxane oligomer, or a hydroxydiorganosiloxy-endblocked methylphenylsiloxane oligomer.

The ingredient C constitutes from 0 to 20 weight percent of the present compositions. When the concentration of this ingredient exceeds 20 weight percent, it becomes difficult to blend ingredients B and C into ingredient A. In addition, the resulting organosiloxane composition is extremely difficult to handle and exhibits reduced vibration-damping properties.

The vibration-damping organosiloxane compositions of this invention comprise ingredients A, B, and C as described hereinabove. The compositions may also contain one or more of the following optional ingredients to alter the appearance, physical properties and other characteristics of the final organosiloxane composition.

One type of optional ingredient is inorganic fillers such as crystalline silica, diatomaceous earth, aluminosilicate, iron oxide, zinc oxide, and calcium carbonate. These inorganic fillers can be treated with an organohalosilane, organoalkoxysilane, organosilazane, or an polyorganosiloxane such as organohydrogenpolysiloxane, hydroxydiorganosiloxy-endblocked dimethylsiloxane oligomer, hydroxydiorganosiloxy-endblocked methylvinylsiloxane oligomer, hydroxydiorganosiloxy-endblocked or methylphenylsiloxane oligomer.

Additional optional ingredients include but are not limited to organic pigments; inorganic pigments; dyes; heat stabilizers; and flame retardants.

The properties of the organosiloxane compositions of this invention are not specifically restricted. For example, the consistency of the composition ranges from an oil to a semisolid, and it preferably ranges from an oil with a viscosity at 25° C. of 500 centipoise to a semisolid almost completely devoid of fluidity. Its properties should be selected as appropriate for the desired end use application.

No specific restriction apply to the method for preparing the present organosiloxane compositions. One method for preparing the compositions comprises mixing ingredients A, B, and C. It can also be prepared by mixing ingredients A and C to homogeneity with finely divided particles of a thermoplastic organic resin containing a blowing agent, referred to hereinafter as ingredient B', that will yield ingredient B upon heating. The resultant mixture is subsequently heating this mixture in order to generate ingredient B.

The latter method is preferred for its efficiency in producing organosiloxane compositions in accordance with the present invention.

The method for preparing the present compositions will now be explained in greater detail.

The preceding descriptions of ingredients A and C and their concentrations in the present compositions also apply to the present method for preparing these compositions.

The combination of finely divided, solid thermoplastic organic resin and blowing agent, referred to in this specification as ingredient B', is the precursor of ingredient B and is converted to hollow particles by means of an irreversible thermally induced expansion. The solid resin particles contain a blowing agent.

Suitable resins for use in combination with a blowing agent as ingredient B' have been discussed in connection with ingredient B. No specific restrictions apply to the blowing agent used to generate the hollow resin particles referred to as ingredient B.

Suitable blowing agents included but are not limited to: aliphatic hydrocarbons such as propane, butane, isobutane, pentane, hexane, heptane, and octane;
aromatic hydrocarbons such as toluene and xylene;
ketones such as acetone, methyl ethyl ketone, and methyl isobutyl ketone;
ethers such as tetrahydrofuran, dimethyl ether, methyl ethyl ether, and diethyl ether;
esters such as methyl acetate, ethyl acetate, and butyl acetate;
other volatile liquids such as dimethyl sulfoxide; and
compounds that generate a gas by thermal decomposition such as diazonium compounds.

When the combination of thermoplastic organic resin and blowing agent is heated at or above the softening point of the resin, the blowing agents become a gas or produce a gas and thereby irreversibly expand ingredient the resin particle, with formation of the hollow resin particles referred to as ingredient B.

After forming the hollow thermoplastic organic resin particles, the blowing agent and/or its residues either remain in the interior of the particles or dissipate to the outside of the hollow particles and are replaced by the atmosphere surrounding the particles.

The morphology of the resin portion of ingredient B' is not specifically restricted and is exemplified by spherical, disk-shaped, and gourd-shaped. A spherical shape is preferred. While the particle size of the unexpanded resin is not specifically restricted, particle sizes in the range of from 1 to 100 micrometers are preferred.

Ingredient B' constitutes from 0.1 to 10 weight of the blend that is subsequently heated to prepare the present organosiloxane compositions. The vibration-damping properties of the corresponding organosiloxane composition become worse at ingredient B' concentration of below 0.1 weight percent, while the final organosiloxane composition is difficult to handle when the concentration of unexpanded resin particles exceeds 10 weight percent.

The characteristic feature of the present method resides in the formation of finely divided hollow particles of a thermoplastic organic resin by the irreversible expansion of ingredient B' that occurs upon heating a composition comprising the homogeneous mixture of ingredients A, B' and C in addition to any optional ingredients.

The mixing sequence for ingredients A, B', and C is not specifically restricted and, for example, may consist of mixing ingredient B' to homogeneity into ingredient A and then mixing ingredient C into the resulting composition; or mixing ingredient C to homogeneity into ingredient A and then mixing ingredient B' into the resulting composition; or mixing ingredients A, B', and C together all at once.

Likewise, there are no specific restrictions on the temperature at which the blend of ingredients A, B', and C are heated. Any temperature that will induce the irreversible expansion of ingredient B' is suitable. For example, heating is carried out to at least the temperature at which the blowing agent portion of ingredient B' is converted to a gas, and is preferably carried out to at least the softening point of the thermoplastic organic resin in ingredient B'. This temperature is preferably in the range of from 50° C. to 200° C., the range of 80° C. to 150° C. being particularly preferred.

Procedures for heating the composition of ingredients A, B', and C include but are not limited to (i) heating a mixture of these ingredients while they are in the process of being blended to homogeneity and (ii) heating the already homogeneous composition without mixing.

No specific restrictions apply to mixing device used to blend ingredients A, B' and C. Suitable mixing devices include but are not limited to planetary mixers, Ross mixers, and Hobart mixers. The particular mixing device used need not be equipped with a heater. When using a mixer such as a Hobart mixer without a heater, a homogeneous composition is first prepared from ingredients A, B', and C, following which the resin particles of ingredient B' must then be expanded by heating this composition in an oven or exposing it to far infrared radiation.

The resultant organosiloxane composition is unique based on the presence of the finely divided particles of hollow thermoplastic organic resin. Because the present compositions have excellent vibration-damping properties and a low specific gravity, they can be used as a lightweight vibration-proof part or element. In addition, through its enclosure or containment in a molding of, for example, natural or synthetic rubber or in a damper, the organosiloxane compositions of this invention can be used as a vibration-damping or vibration-isolating part or ingredient in optical read-out devices such as compact disks and laser disks; in magnetic read-out devices such as magnetic disks, "floptical" disks; and in precision equipment such as precision measurement devices.

EXAMPLES

The following examples describe preferred embodiments of the present composition and method, and should not be interpreted as limiting the scope of the invention as defined in the accompanying claims. Unless otherwise specified all parts and percentages in the examples are by weight and viscosities are the values measured at 25° C. The vibration-damping capacity of the compositions was evaluated by measuring tan delta, a function of the loss modulus and storage modulus of a material, using a Rheometrics RDA 700 dynamic analyzer from Rheometrics, Incorporated.

Example 1

A dispersion of hollow finely divided powder of a thermoplastic organic resin in a liquid polyorganosiloxane was prepared by placing 1,920 g of a trimethylsiloxy-endblocked dimethylpolysiloxane exhibiting a viscosity 5,000 centistokes ($5 \times 10^{-3}$ m2/sec) and 80 g of a finely divided vinylidene chloride-acrylonitrile copolymer in a heater-equipped stirring vessel. The particles of vinylidene chloride-acrylonitrile copolymer contained isobutane as a blowing agent, exhibited a particle diameters of 16 to 32 micrometers, and had an expansion initiation temperature of 140° C.

The mixture of resin and polyorganosiloxane was heated to 145° C. while stirring it to homogeneity, and maintained at this temperature with stirring for an additional 10 minutes. Cooling of the reaction mixture yielded an organosiloxane composition of the present invention.

This silicone composition had a viscosity of 230 poise (23 Pa.s). The diameter of the hollow vinylidene chloride-acrylonitrile copolymer particles in the final composition were from 60 to 130 micrometers. Table 1 reports the vibration-damping performance of this organosiloxane composition.

When the organosiloxane composition was allowed to stand in a transparent glass container, no change in appearance occurred after 1 month at room temperature. After three months a portion of the hollow copolymer particles separated into an upper layer.

Example 2

An organosiloxane composition of this invention was prepared by placing 1,920 g of a trimethylsiloxy-endblocked dimethylpolysiloxane exhibiting a viscosity of 60,000 centistokes ($60 \times 10^{-3}$ m$^2$/sec) and 80 g of finely divided particles of a vinylidene chloride-acrylonitrile copolymer in a heater-equipped stirring vessel. The copolymer particles contained isobutane as blowing agent, exhibited particle diameters of from 16 to 32 micrometers and an expansion initiation temperature of 140° C. A homogeneous material was prepared by stirring, and was then heated to 145° C. and maintained at this temperature for an additional 10 minutes. Cooling of the resultant material yielded a organosiloxane composition of the present invention.

The hollow particles of vinylidene chloride-acrylonitrile copolymer that formed during heating exhibited particle diameters of 60 to 130 micrometers. Table 1 reports the vibration-damping performance of this organosiloxane composition. When the composition was allowed to stand in a transparent glass container, no change in appearance was observed following one month of storage at room temperature. After three months part of the hollow particles powder separated to form an upper layer.

Example 3

A composition of this invention was prepared by placing the following ingredients in a heater-equipped stirring vessel: 1,910 g of a trimethylsiloxy-endblocked dimethylpolysiloxane exhibiting a viscosity of 10,000 centistokes ($1 \times 10^{-2}$ m$^2$/sec), 10 g of finely divided particles of a vinylidene chloride-acrylonitrile copolymer, and 80 g of fumed silica exhibiting a specific surface area of 200 m$^2$/g.

The particles of vinylidene chloride-acrylonitrile copolymer contained isobutane as blowing agent, exhibited particle diameters of from 10 to 20 micrometers, and had an expansion initiation temperature of 80° C.

The mixture of copolymer particles and dimethylpolysiloxane was heating to 85° C. while stirring to homogeneity, and was maintained at this temperature with stirring for an additional ten minutes, at which time it was allowed to cool to yield an organosiloxane composition of the present invention. The viscosity of the composition was 150 poise (15 Pa.s)

The hollow copolymer particles exhibited diameters of from 35 to 85 micrometers.

Table 1 reports the vibration-damping performance of this organosiloxane composition as tan delta values. When the silicone compound was allowed to stand in a transparent glass container, no change in appearance occurred after 3 months at room temperature.

Examples 4 to 6

Three organosiloxane compositions of the present invention were prepared by placing the following ingredients in a heater-equipped stirring vessel:

1,910 g of a trimethylsiloxy-endblocked dimethylpolysiloxane exhibiting a viscosity of 10,000 centistokes ($1 \times 10^{-2}$ m$^2$/sec), finely divided particles of a vinylidene chloride-acrylonitrile copolymer in the quantity reported in Table 1, and a fumed silica exhibiting a specific surface area of 200 m$^2$/g. in the quantity reported in Table 1. The surface of the silica particles had been treated with dimethyldichlorosilane The vinylidene chloride-acrylonitrile copolymer particles contained isobutane as blowing agent, had particle diameters of 10 to 20 micrometers, and had an expansion initiation temperature of 80° C. Each of the mixtures of copolymer particles and dimethylpolysiloxane was heating to 85° C. while stirring to homogeneity, and maintained at this temperature for ten minutes while stirring was continued. The three mixtures were then allowed to cool to yield compositions of the present invention.

The hollow copolymer particles in each of the compositions exhibited particle diameters of from 35 to 85 micrometers. Table 1 reports the vibration-damping performance of the three organosiloxane compositions.

When the three compositions referred to as examples 4, 5 and 6, were allowed to stand in transparent glass containers, no change in appearance occurred after 1 month at room temperature. After standing for three months a portion of the copolymer particles in the composition that not contain fume silica separated to form an upper layer.

Comparative Example 1

1,400 g trimethylsiloxy-endblocked dimethylpolysiloxane with a viscosity of 10,000 centistokes was introduced into a heater-equipped stirring vessel. A homogeneous composition was prepared by the introduction in portions with stirring of 600 g of fumed silica exhibiting a specific surface area of 200 m$^2$/g. The surface of the silica particles had previously been treated with dimethyldichlorosilane in three portions. The resultant mixture was stirred while being heated at 140° C. under a pressure of 10 mm Hg or less for 10 minutes to yield a silicone compound with a viscosity of approximately 1000 Pa.s.

The vibration-damping properties of this organosiloxane composition outside the scope of the present invention are reported in Table 1 as tan delta values.

Comparative Example 2

1.1 kg of a trimethylsiloxy-endblocked dimethylpolysiloxane with a viscosity of 5,000 centistokes $5 \times 10^{-3}$ m$^2$/sec. was introduced into a heater-equipped stirring vessel. A composition was prepared by the introduction while stirring of 0.9 kg of a powdered silicone resin exhibiting particle diameters from 20 to 200 micrometers and an average particle diameter of 80 micrometers. The vibration-damping properties of this organosiloxane composition are reported in Table 1 as tan delta values.

Comparative Examples 3 to 5

Homogeneous compositions outside the scope of the present invention were prepared by introducing 1,400 g of a trimethylsiloxy-endblocked dimethylpolysiloxane with a viscosity of 10,000 centistokes ($1 \times 10^{-2}$ m$^2$/sec) into a heater-equipped stirring vessel and by then introducing into the vessel with stirring the quantities of fumed silica reported in Table 1. The silica exhibited a specific surface area of 200 m$^2$/g reported in Table 1. The silica had been pre-treated with dimethyldichlorosilane.

The resultant mixtures were in each case heated with stirring at 140° C. under a pressure of 10 mm Hg or less to yield three organosiloxane compositions outside the scope of the present invention that are referred to as comparative examples 3, 4, and 5.

The vibration-damping properties of the three compositions are reported in Table 1 as tan delta values.

TABLE 1

|  | Present | | | | | | Comparative Examples | | | | |
|---|---|---|---|---|---|---|---|---|---|---|---|
|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 |
| Composition (wt %) | | | | | | | | | | | |
| Polyorganosiloxane | 96 | 96 | 95.5 | 90 | 94.5 | 95 | 70 | 55 | 93 | 92 | 90 |
| Hollow Resin Particles | 4 | 4 | 0.5 | 5 | 2 | 5 | — | — | — | — | — |
| Silica | — | — | 4 | 5 | 3.5 | — | 30 | — | 7 | 8 | 10 |
| Organosiloxane Resin Particles | — | — | — | — | — | — | — | 45 | — | — | — |
| tan delta values | | | | | | | | | | | |
| 0.1 Hz | 9.622 | 8.694 | 9.851 | 7.643 | 11.54 | 10.38 | 0.874 | 3.593 | 3.070 | 3.752 | 3.202 |
| 1.0 Hz | 18.59 | 18.35 | 18.65 | 24.82 | 16.63 | 14.49 | 1.007 | 13.30 | 6.795 | 6.277 | 5.711 |
| 10.0 Hz | 34.70 | 29.79 | 23.43 | 46.25 | 10.67 | 13.37 | 1.726 | 25.97 | 6.022 | 6.215 | 5.652 |
| measurement conditions | | | | | | | | | | | |
| plate diameter | 20 mm | | | | | | | | | | |
| frequency: | 0.1 Hz, 1.0 Hz, 10 Hz | | | | | | | | | | |
| strain | 10% | | | | | | | | | | |
| sample thickness | 0.6 mm | | | | | | | | | | |

That which is claimed is:

1. A method for preparing an organosiloxane composition containing finely divided, hollow resin particles, said method comprising heating a mixture comprising
   (A) 70 to 99.9 weight percent of a polyorganosiloxane oil,
   (B') 0.1 to 10 weight percent of a finely divided thermoplastic organic resin containing a heat-activated blowing agent and
   (C) 0 to 20 weight % thickener
wherein said mixture is heated sufficiently to activate said blowing agent, resulting in an irreversible expansion of said resin particles.

2. A method according to claim 1 wherein said oil is a trimethylsiloxy- or hydroxydimethylsiloxy-terminated polyorganosiloxane; the silicon-bonded organic groups present on said oil are selected from the group consisting of alkyl, alkenyl, aryl, aralkyl and substituted alkyl radicals; the viscosity of said oil is from $1 \times 10^{-4}$ to 1 $m^2$/second; said resin is selected from the group consisting of homopolymers and copolymers of vinylic monomers, polyamides and polyesters and exhibit particle sizes of from 5 to 500 micrometers; said thickener is selected from the group consisting of finely divided silica exhibiting a specific surface area of at least 50 $m^2$/g, fumed titanium dioxide, colloidal calcium carbonate, alumina, iron oxide, carbon black and liquid polyether resins; said blowing agent is selected from the group consisting of aliphatic hydrocarbons, aromatic hydrocarbons, ketones, ethers, esters, dimethyl sulfoxide, and compounds that generate a gas during a thermally induced decomposition; the particle size of said resin is from 1 to 100 micrometers; and said mixture is heated at from 50° to 200° C.

3. A method according to claim 2, wherein said polyorganosiloxane is a polydiorganosiloxane and said thickener is silica exhibiting a specific surface area of from 100 to 500 $m^2$/g ; said blowing agent is an aliphatic hydrocarbon and said mixture is heated at from 80° to 150° C.

* * * * *